United States Patent
Perlo et al.

(10) Patent No.: US 9,963,009 B2
(45) Date of Patent: May 8, 2018

(54) AIR-HEATING BLOWER DEVICE FOR A MOTOR VEHICLE

(71) Applicants: Interactive Fully Electrical Vehicles S.r.l., Sommariva del Bosco (CN) (IT); Poli-Model S.r.l., Moncalieri (TO) (IT)

(72) Inventors: Pietro Perlo, Rivoli (IT); Pietro Guerrieri, Rivoli (IT)

(73) Assignees: Interactive Fully Electrical Vehicles S.r.l., Sommariva del Bosco (CN) (IT); Poli-Model S.r.l., Moncalieri (TO) (IT)

( * ) Notice: Subject to any disclaimer, the term of this patent is extended or adjusted under 35 U.S.C. 154(b) by 0 days. days.

(21) Appl. No.: 15/320,048

(22) PCT Filed: Jun. 19, 2015

(86) PCT No.: PCT/IB2015/054613
§ 371 (c)(1),
(2) Date: Dec. 19, 2016

(87) PCT Pub. No.: WO2015/193843
PCT Pub. Date: Dec. 23, 2015

(65) Prior Publication Data
US 2017/0246929 A1 Aug. 31, 2017

(30) Foreign Application Priority Data

Jun. 20, 2014 (IT) ............................. TO2014A0499

(51) Int. Cl.
*F24H 3/02* (2006.01)
*A45D 20/10* (2006.01)
(Continued)

(52) U.S. Cl.
CPC ..... *B60H 1/00464* (2013.01); *B60H 1/00478* (2013.01); *B60H 1/2225* (2013.01);
(Continued)

(58) Field of Classification Search
None
See application file for complete search history.

(56) References Cited

U.S. PATENT DOCUMENTS

| 1,995,769 | A | * | 3/1935 | Fiege | ....................... H05B 3/84 |
| | | | | | 219/203 |
| 3,026,401 | A | * | 3/1962 | Cheviron | .................. B60S 1/54 |
| | | | | | 219/203 |

(Continued)

FOREIGN PATENT DOCUMENTS

| CA | 2352673 | 1/2003 |
| DE | 2402942 | 7/1974 |

(Continued)

OTHER PUBLICATIONS

International Search Report and the Written Opinion dated Oct. 5, 2015 From the International Searching Authority Re. Application No. PCT/IB2015/054613.

*Primary Examiner* — Thor Campbell

(57) ABSTRACT

An air-heating blower device for a passenger compartment of a motor vehicle comprising a body with at least one inlet opening at least one outlet opening an electrically driven axial fan rotatably mounted around its axis within the body. The fan is associated to an electric motor (M) with toroidal geometry, having an annular rotor which is rotatable within an annular stator and defining a central opening inside thereof, said fan (F) having one or more blades (B) which are carried by the rotor and each blade extending into said central opening towards a free end of the blade which terminates at a distance from the central axis of the fan, and in that the annular body of the rotor and/or the annular body of the stator define a guide tube for the airflow activated by the fan (F) over the resistive electric heater (H).

14 Claims, 7 Drawing Sheets

(51) Int. Cl.
  *B60H 1/00* (2006.01)
  *B60H 1/22* (2006.01)
  *B60H 1/34* (2006.01)
  *F04D 25/06* (2006.01)
  *F04D 25/08* (2006.01)
  *F04D 29/58* (2006.01)
  *F04D 29/32* (2006.01)

(52) U.S. Cl.
  CPC ........... *B60H 1/3421* (2013.01); *F04D 25/06* (2013.01); *F04D 25/08* (2013.01); *F04D 29/325* (2013.01); *F04D 29/582* (2013.01); *B60H 2001/2287* (2013.01)

(56) References Cited

U.S. PATENT DOCUMENTS

| | | | | |
|---|---|---|---|---|
| 4,596,921 A * | 6/1986 | Hersh | F24H 3/0423 | 181/225 |
| 4,678,410 A * | 7/1987 | Kullen | F04D 29/325 | 34/96 |
| 4,874,921 A * | 10/1989 | Gerbig, Jr. | B60H 1/00264 | 219/202 |
| 4,904,844 A * | 2/1990 | Chamberlin | B60S 1/54 | 219/203 |
| 4,965,432 A * | 10/1990 | Harris | B60H 1/0025 | 219/203 |
| 5,025,130 A * | 6/1991 | Slone | B60H 1/00264 | 219/203 |
| 5,075,606 A * | 12/1991 | Lipman | H02K 7/14 | 310/63 |
| 5,078,628 A * | 1/1992 | Garis, Jr. | B63H 5/14 | 114/20.2 |
| 5,296,678 A * | 3/1994 | Schnorf | B60H 1/2225 | 165/42 |
| 5,306,183 A * | 4/1994 | Holt | B63H 5/14 | 310/114 |
| 5,463,203 A * | 10/1995 | Moore | B60H 1/00264 | 219/202 |
| 5,781,695 A * | 7/1998 | Summers | B60H 1/00264 | 219/202 |
| 5,787,228 A * | 7/1998 | Fiely | B60H 1/00264 | 219/203 |
| 5,844,202 A * | 12/1998 | Alverson | B60H 1/00264 | 219/202 |
| 5,875,562 A * | 3/1999 | Fogarty | A45D 20/10 | 34/97 |
| 5,884,007 A * | 3/1999 | Fein | B60H 1/2225 | 219/202 |
| 5,884,008 A * | 3/1999 | Goldberg | A45D 20/12 | 206/320 |
| 6,049,655 A * | 4/2000 | Vazirani | B60H 1/00264 | 219/202 |
| 6,167,193 A * | 12/2000 | Birdsell | F24H 3/0417 | 219/506 |
| 6,393,208 B1 * | 5/2002 | Nosenchuck | A45D 20/10 | 34/97 |
| 8,299,669 B2 * | 10/2012 | Gieras | B63H 23/24 | 310/156.02 |
| 8,307,948 B2 * | 11/2012 | Parodi | A45D 20/12 | 181/212 |
| 8,487,466 B2 * | 7/2013 | Schroeder | B63H 1/16 | 290/52 |
| 8,575,817 B2 * | 11/2013 | Platon | H02K 1/14 | 310/112 |
| D769,431 S * | 10/2016 | Lopez | D23/324 | |
| 9,599,367 B1 * | 3/2017 | Curry | F24H 3/0417 | |
| 9,603,200 B1 * | 3/2017 | Bennett | H05B 3/84 | |
| 9,693,616 B2 * | 7/2017 | Sakuma | A45D 20/12 | |
| 9,819,246 B2 * | 11/2017 | Ziegler | H02K 9/06 | |
| 2006/0254073 A1 * | 11/2006 | Zhen | A45D 20/10 | 34/96 |
| 2007/0126297 A1 * | 6/2007 | de Zwart | B63H 1/16 | 310/86 |
| 2008/0193111 A1 * | 8/2008 | Seutter | A47K 10/48 | 392/381 |
| 2016/0368600 A1 * | 12/2016 | Frolov | G08G 5/0021 | |

FOREIGN PATENT DOCUMENTS

| | | |
|---|---|---|
| EP | 1885047 | 2/2008 |
| JP | 56-154307 | 11/1981 |
| WO | WO 2015/193843 | 12/2015 |

* cited by examiner

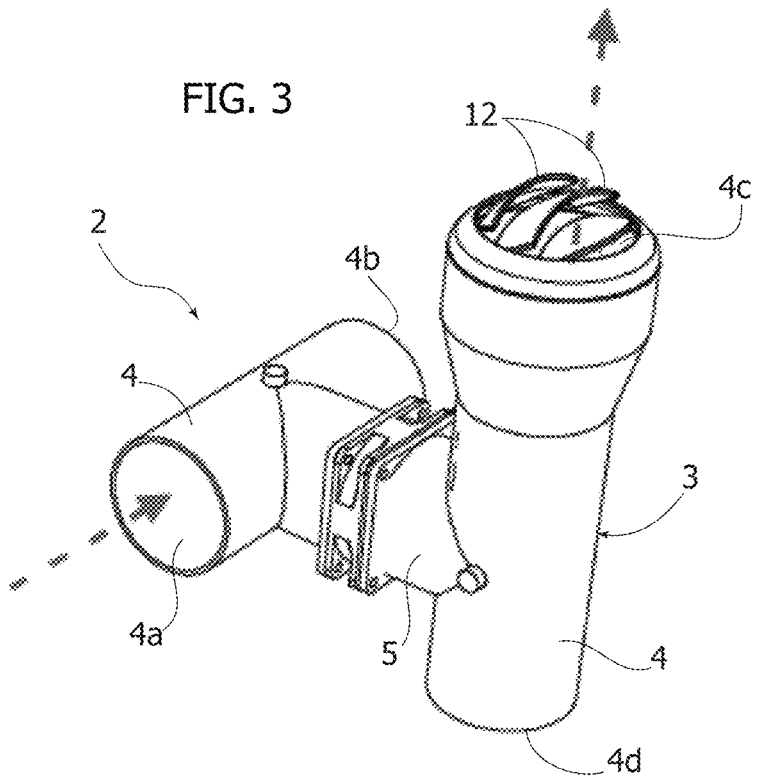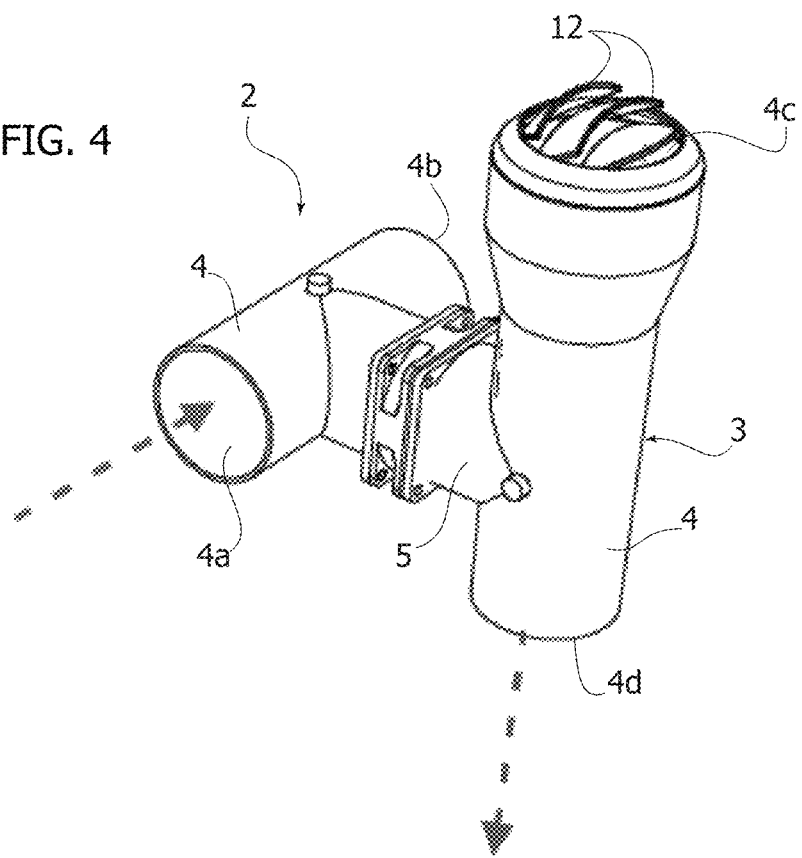

AIR-HEATING BLOWER DEVICE FOR A MOTOR VEHICLE

RELATED APPLICATIONS

This application is a National Phase of PCT Patent Application No. PCT/IB2015/054613having International filing date of Jun. 19, 2015, which claims the benefit of priority of Italian Patent Application No. TO2014A000499 filed on Jun. 20, 2014. The contents of the above applications are all incorporated by reference as if fully set forth herein in their entirety.

FIELD AND BACKGROUND OF THE INVENTION

The present invention relates to an air-heating blower device for a passenger compartment of a motor vehicle, said device being of the type comprising a body with at least one inlet opening and at least one outlet opening, an electrically driven axial fan rotatably mounted within the body for generating a flow of air from the inlet openings to the outlet opening, and an electric heater carried by the body and adapted to heat the airflow directed towards the outlet opening.

A device of this type is for example known from document U.S. Pat. No. 4,366,368 or from document JP S56 154307.

The advantage of this kind of devices is to supply in a very short time a hot flow of air adapted for example to defrost the windshield after a long stop at low temperature, without the need to wait the warm-up of the motor vehicle.

PURPOSE OF THE INVENTION

The purpose of the invention is to achieve a device of this kind which is suitable to be easily integrated in the dashboard or in another part of the passenger compartment of the motor vehicle and which is characterized by high characteristics of efficiency, of low weight and of low size.

SUMMARY OF THE INVENTION

In order to achieve this purpose, the invention provides an air-heating blower device for a passenger compartment of a motor vehicle having the above specified characteristics and further characterized in that said axial fan is associated with an electric motor with toroidal geometry, having an annular rotor which is rotatable within an annular stator and defining a central opening inside thereof, said fan having one or more blades which are carried by the rotor and each blade extending into said central opening towards a free end of the blade which terminates at a distance from the central axis of the fan, and in that the annular body of the rotor and/or the annular body of the stator define a guide tube for the airflow activated by the fan, and in that said electric heater (H) comprises a heater body to which one or more electric resistors are associated, said heater body (H) having a substantially cylindrical shape, having a heater axis substantially aligned with the axis of said fan, so as to be embedded within the airflow activated by the fan (F).

In one embodiment, said guide tube for the airflow generated by said axial fan is provided with stationary fins supporting said cylindrical heater body in a cantilevered way. Electrical machines suitable to be used in a device according to the invention were developed in recent years for use such as engines or generators. A particularly interesting solution for the purposes of the invention is illustrated in European patent EP 1 885 047131 and in the corresponding U.S. Pat. No. 7,592,712B2 of the same inventor. A detailed description of an electric motor of this type is provided hereinafter.

According to a further characteristic of the invention, the conformation of said one or more blades is such as to converge the airflow towards a focus point positioned downstream the fan with reference to the flow direction. Thanks to this characteristic, the fan of the device according to the invention has a higher efficiency and provides a higher thrust.

The body of the device is intended to be positioned within a dashboard of a motor vehicle. In the preferred embodiment this body has a first inlet opening communicating with the interior of the motor vehicle, a second inlet opening communicating with a duct for supplying outside air and a swivel door for controlling communication of the two inlet openings with the fan.

In addition or alternatively, the body of the device has a first outlet opening for directing the flow of air toward a windshield and/or the passengers of the motor vehicle, a second outlet opening for directing the flow of air towards the floor of the motor vehicle and a door for controlling communication of the fan with the two outlet openings. Said first outlet opening is preferably provided with adjustable louvers.

According to a further preferred characteristic, the body of the heater has a cylindrical tubular shape and it is positioned with its axis oriented in the direction of the flow of air activated by the fan, in such a way that its inner surface and/or its outer surface are exposed to the airflow. In a second embodiment, the body of the heater is a solid cylindrical body positioned with its axis oriented in the direction of the flow of air activated by the fan, in such a way that its outer surface is exposed to the airflow. In both cases, the outer surface of the body of the heater is preferably provided with a plurality of radially arranged longitudinal fins.

In a further embodiment, the device further comprises at least one electric Peltier-effect cooler.

According to a further characteristic, the electric motor for driving the fan, the electric heater and/or the electric cooler are connected to the battery of the electric circuit of the motor vehicle, as well as to an onboard electric generator of the motor vehicle, as well as to an electronic control unit, programmed to enable the power supply of the heater and/or the cooler as a function of the charge state of the battery and/or of the operating condition of the electric generator.

BRIEF DESCRIPTION OF THE SEVERAL VIEWS OF THE DRAWINGS

Further features and advantages of the present invention will become readily apparent from the following description with reference to the annexed drawings, given purely by way of non-limiting example, in which:

FIGS. 3, 4, 5 and 6 are perspective views of the device according to the invention which show different modes of operation of the device with reference to the inlet openings and the outer openings which are activated.

DESCRIPTION OF SPECIFIC EMBODIMENTS OF THE INVENTION

Figure 1:
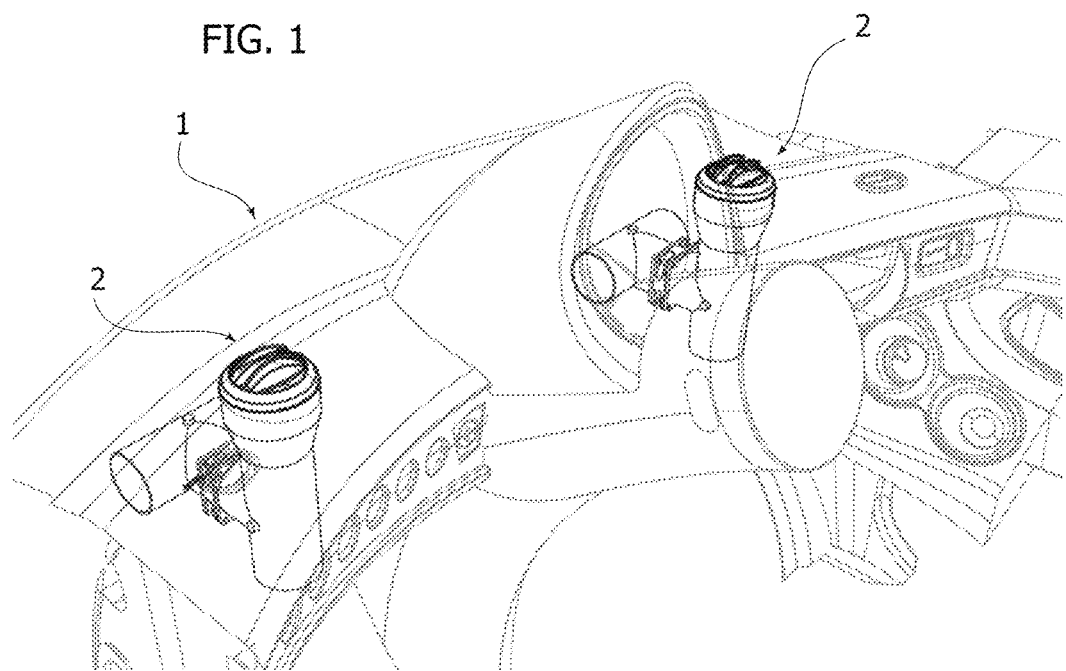
FIG. 1 is a perspective view in transparency of a dashboard of a motor vehicle wherein are integrated two air heating blower devices according to the invention.
Figure 2:
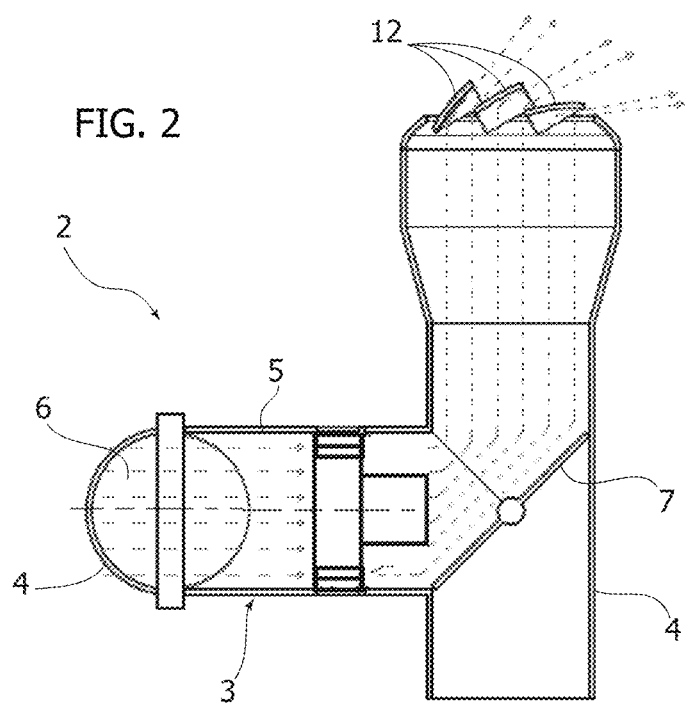
FIG. 2 is a schematic view in cross-section of the device of the invention.

In FIG. 1, numeral 1 generally indicates a dashboard of a motor vehicle (illustrated in transparency) wherein a pair of air heating blower devices are incorporated, according to the present invention.

Referring also to FIGS. 2-6, each of these devices is generally designated with reference numeral 2 and has a hollow body 3 which, in the illustrated embodiment, has a general double T configuration, with one of the heads of the T (indicated with 4) rotated of 90° relative to the other, and a central portion 5 which connects them.

The end portions of a first T head 4 define inlet openings 4a, 4b respectively adapted to receive air from the interior of the motor vehicle and from the external environment to the motor vehicle. The end portions of the other T head 4 define outlet openings 4c, 4d respectively oriented to direct the cold and/or hot flow of air generated by the device 2 towards the windshield and/or the passengers of the motor vehicle (in the case of the outlet opening 4c) and towards the floor of the motor vehicle (in the case of the outlet opening 4d).

Within the body of the device there are provided two swivel doors 6, 7 (FIG. 2), which can have a manual control or a control by an electric motor, these doors respectively controlling the communication of the two inlet openings 4a, 4b and of the two outlet openings 4c, 4d with the internal cavity of the connecting portion 5, where an axial fan F with the associated electric motor M are provided.

The arrows in FIGS. 3-6 show the different operational modes which are activated by means of the swivel doors 6, 7:

FIG. 3: entrance of air from the interior of the motor vehicle and exit of air towards the windshield and/or the passengers.

FIG. 4: entrance of air from the interior of the motor vehicle and exit towards the floor.

Figure 5:
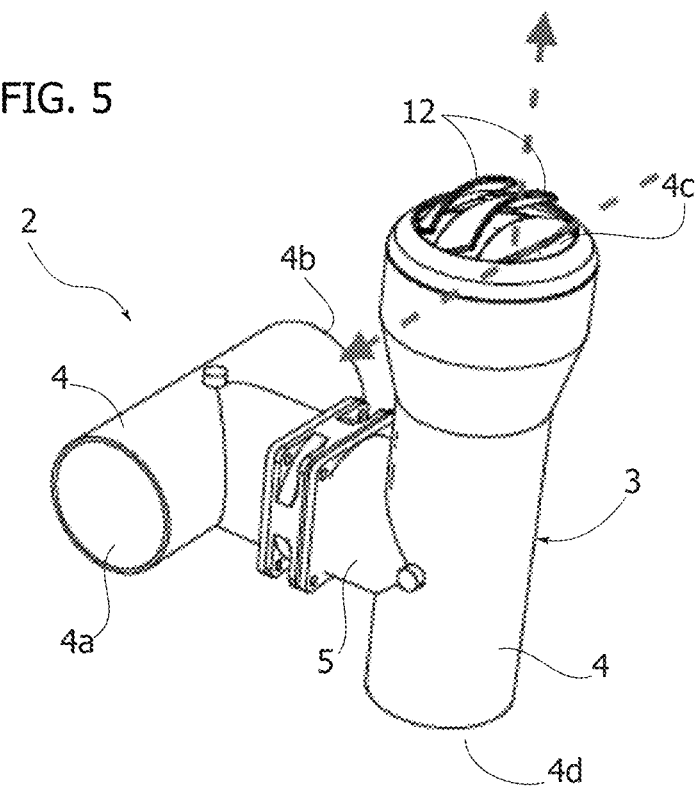

FIG. 5: entrance of air from the external environment and exit of air towards the windshield and/or the passengers.

Figure 6:
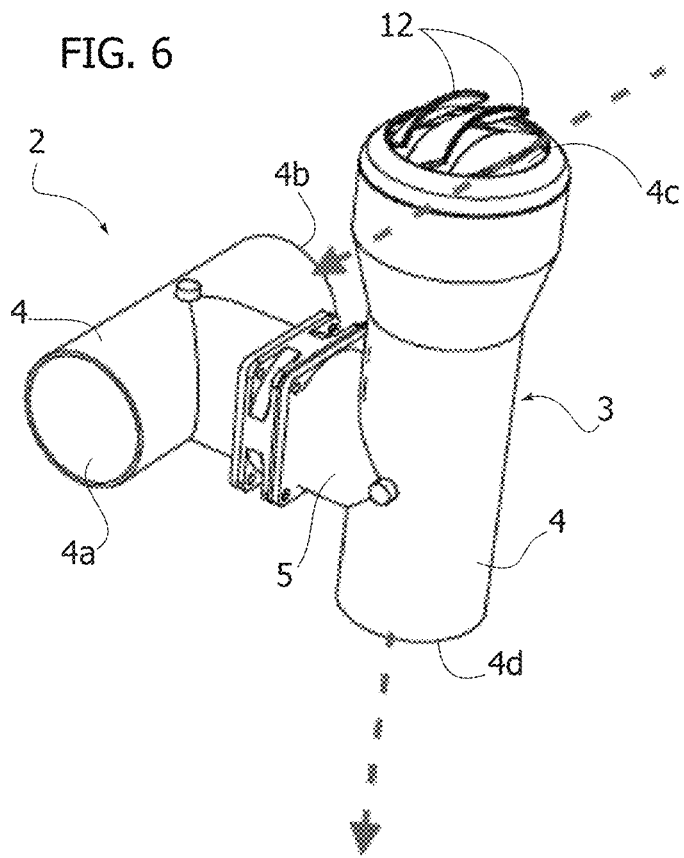

FIG. 6: entrance of air from the external environment and exit toward the floor.

The outlet opening 4c is provided with manually adjustable louvers 12 to direct the flow of air towards the windshield and/or the passengers of the motor vehicle.

Figure 7A:
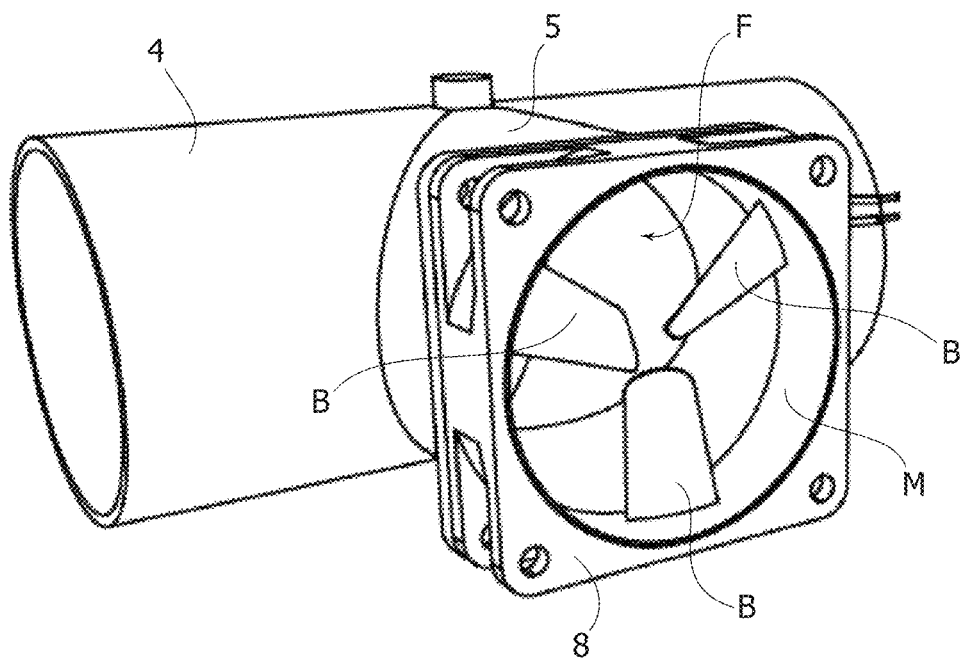
FIG. 7A is a similar view of the FIG. 7, wherein also the heater has been removed.
Figure 8:
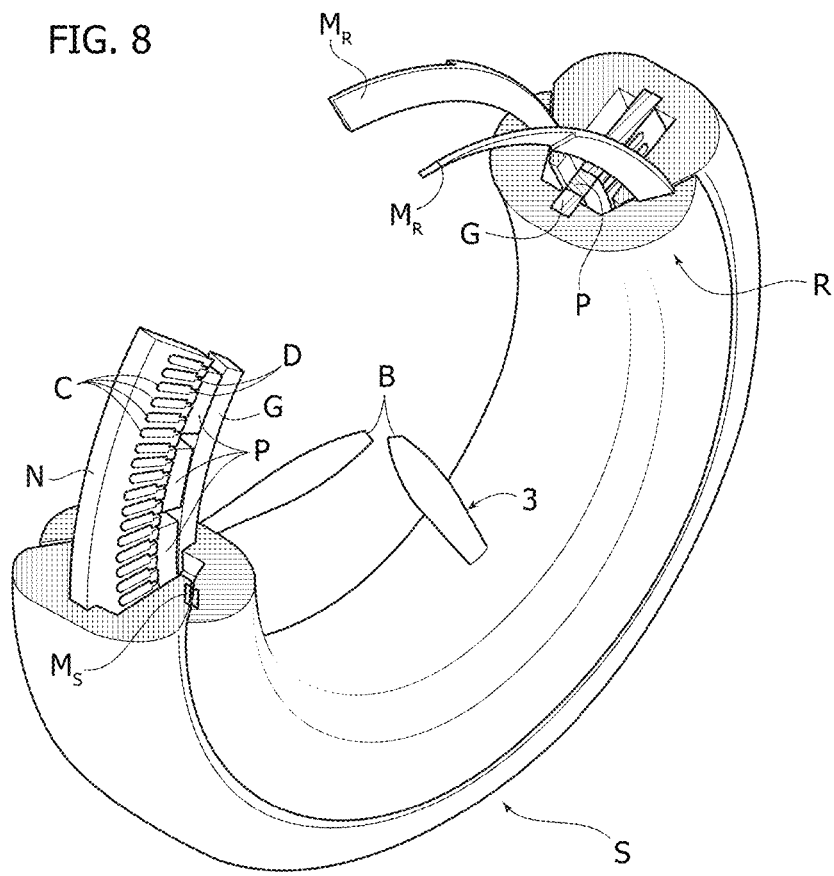
FIG. 8 is a perspective view, partially in cross-section of an electric machine according to the prior art, which was originally studied to operate as a generator in association with a rotor driven by a flow of air, and which is instead used as motor to drive the fan in the device according to the invention.

According to a fundamental characteristic of the invention, the fan F is associated with an electric motor M with toroidal geometry having an annular rotor R (see in particular FIG. 8) which is rotatable within an annular stator S and defining a central opening inside thereof in which the blades B of the fan F extend. As shown in FIGS. 7A and 8, the toroidal body of the electric motor M, defined by the annular bodies of the rotor and of the stator, constitutes a guiding and conveying tube for the flow of air activated by the fan F.

As already indicated above, electric machines adapted to be built with the toroidal configuration shown in FIG. 7A have already been proposed and developed in the past in other applications. FIG. 8 of the attached drawings is derived from document EP 1 885 047 B1 and from corresponding document U.S. Pat. No. 7,592,712 B2, of the same inventor. In the case of such documents, the electric machine is used as electric generator associated with a rotor which is put in rotation by the wind.

In FIG. 8 the body of the stator S and the body of the rotor R are shown in cross-section in order to show the components inside them. Firstly, in the case of the illustrated embodiment of FIG. 8, the rotor R is rotatably supported within the stator S by means for providing a magnetic sustenance, which is obtained by two pairs of annular permanent magnets $M_R$ and $M_S$. In FIG. 8, with N is indicated an annular core which is part of the stator S, constituted of ferromagnetic material, such as SMC ("Soft Magnetic Composite"), Ferrites, and Neodymium-Iron-Borum based composites. Starting from the internal surface of the annular core N there are formed slots C adapted for receiving windings (not shown) associated with the stator S and intended to cooperate with permanent magnets carried by the rotor R. With D there are indicated the teeth defined between adjacent slots C. The rotor R includes an annular core G, which also is of ferromagnetic material, such as SMC. The rotor R further has an annular series of permanent magnets P radially outside of the core G, these magnets being arranged in such a way as to create an alternation of magnetic north and south poles intended to cooperate with the windings of the stator S to generate a rotation of the rotor R following the passage of electric current through the windings. In a variant, the rotor can be constituted by a plurality of layers of composite magnetic material positioned in such a way to create an alternation of magnetic north-south poles. In another variant the rotor R can be constituted by a plurality of permanent magnets positioned in a so called "Halbach array" configuration, which is known per se, with the purpose of decreasing weight and size of the rotor R. The blades B extend from the internal surface of the body of the rotor R.

As shown in the drawings, in the embodiment illustrated herein, the blades B do not meet each other at the center of the rotor, but they remain instead spaced from each other, in such a way as to leave a central portion of the opening inside the rotor free. However, it is instead possible to provide the blades 3A in such a way that they are joined to each other in the center of the opening.

Naturally, although the above described electric motor is considered as the most suitable to be applied in the system according to the invention, it does not represent the only possible solution. Any other kind of electric motor which has a toroidal configuration similar to that described above can be also used. The induction electric machines have a lower efficiency, but they are produced on large scale and they have the advantage of a robust and low cost technology. A better compromise in terms of cost, efficiency and safety is constituted by reluctance machines, both according to synchronous and switched reluctance technologies.

Compared to the conventional solutions, the axial flow machines have preferred characteristics in terms of efficiency and specific torque. An electric motor with axial field comprises a rotatable rotor and generators/paths with multiple axial flows (permanent magnets, variable reluctance channels, squirrel cage elements) carried by the rotor. The axial flow generators are oriented in such a way that the magnetic flow produced by them is axially oriented at least for a substantial part. The axial flow generators are positioned around the rotor with alternate orientation of the flow direction, in such a way that the direction of the flow of adjacent segments is axially oriented at least for a substantial part, but in opposite directions. The axial flow machines can be provided with reduced or zero content of rare earth elements and they are therefore of low cost.

Figure 7:
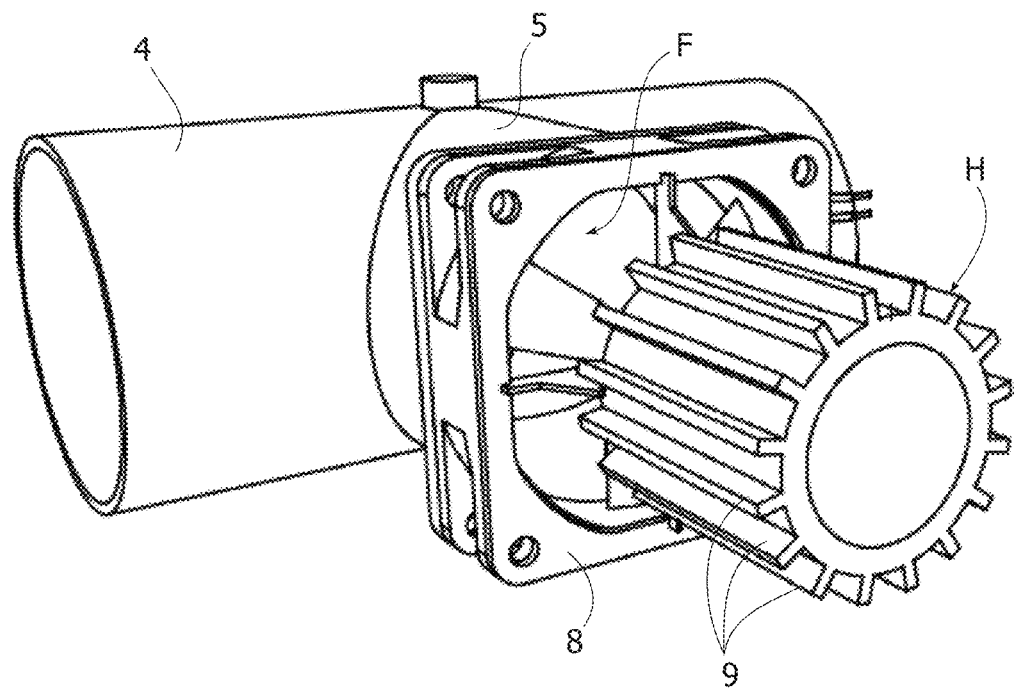
FIG. 7 is a perspective view and at an enlarged scale of the device according to the invention with some parts removed.

As shown in FIG. 7, the body of the stator is mounted within a frame 8 which is part of the body 3 of the device.

The frame 8 supports also an electric heater H comprising a substantially cylindrical body of the heater, wherein one or more electric resistors are associated (not shown in the drawings) and which is positioned within the body 3 of the device in such a way to be embedded within the airflow activated by the fan F. The cylindrical body H of the heater has its axis aligned with the axis of the fan F and it is supported in a cantilevered way by stationary fins protruding from the tube wall that guides the flow of air generated by the fan F.

In the embodiment of FIGS. 7, 7A, the body of the heater has a cylindrical tubular shape and it is positioned with its internal surface and/or its external surface exposed to the flow.

Figure 9:
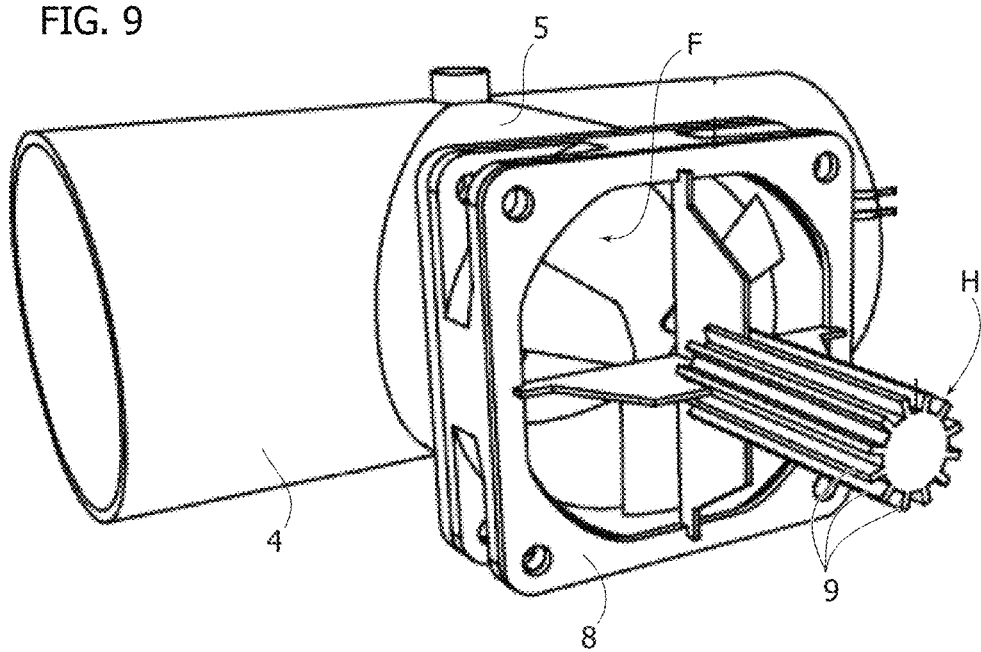
FIG. 9 shows a variant of FIG. 7.

In the variant of FIG. 9, the body of the heater is a solid cylindrical body positioned with its axis oriented in the direction of the flow of air activated by the fan, arranged in such a way that its outer surface is exposed to the air flow.

In both the variants of FIGS. 7 and 9 the external surface of the body of the heater has a plurality of radially-arranged longitudinal fins.

Figure 11:
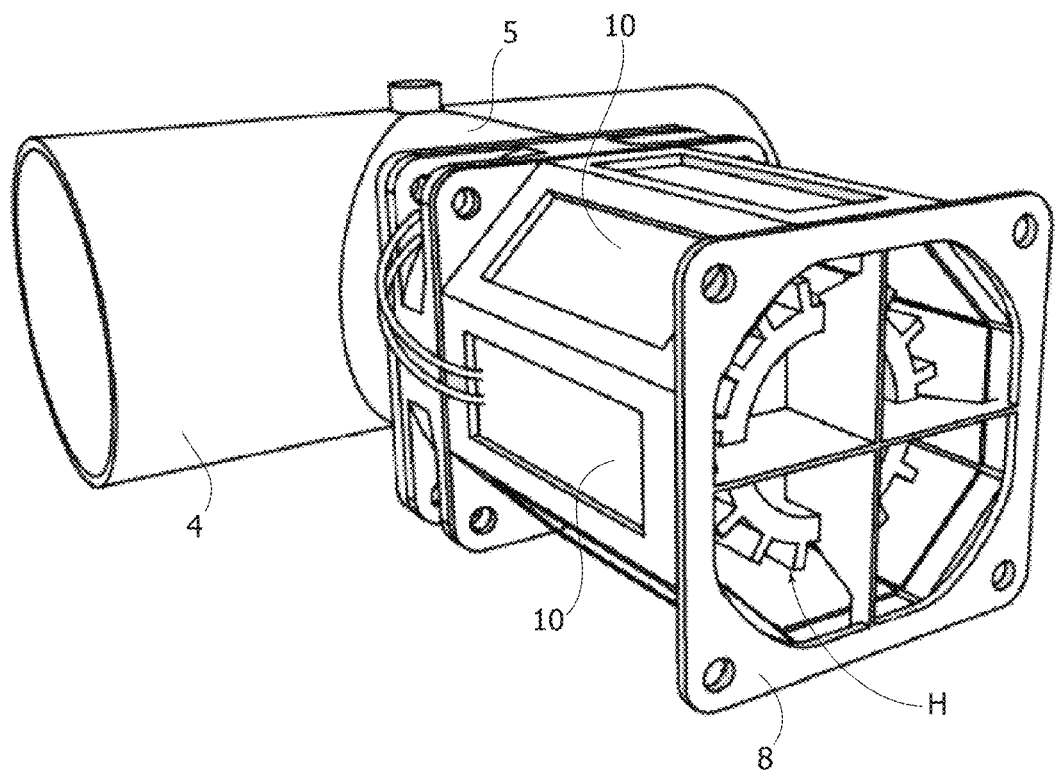
FIG. 11 shows a further variant of FIG. 6.

In the variant of FIG. 11, the device further comprises at least one electric cooler. In the specific embodiment there are provided more Peltier-effect panels 10 carried by the frame 8 and positioned at the periphery of the passage of the flow of air activated by the fan F.

The electric motor M for driving the fan F, the electric heater H and/or the electric coolers 10 are connected to the battery of the electric circuit of the motor vehicle, to an onboard electric generator and to an electronic control unit programmed to enable power supply to the heater and/or to the cooler as a function of the charge state of the battery and/or the operating condition of the electric generator.

In one embodiment, the heater is a multiple coil heater and it is arranged to be powered either by the low voltage battery of the vehicle, or directly by the mains supply.

In the case of application to an electrically powered motor vehicle, one or more devices are provided according to the invention, distributed over one or several compartments-areas of the electric vehicle, for a pre-heating conditioning or the maintenance of a predetermined temperature at said compartments-areas, said devices being arranged to be powered from the electric mains supply and to be controlled by a remote control unit.

In this last case, as reference to an application of an electric vehicle, one or more compartments of the electric vehicle are thermally pre-conditioned or maintained at a fixed temperature using the energy of the electric mains supply. The pre-conditioning will be managed by a remote control.

Figure 10:
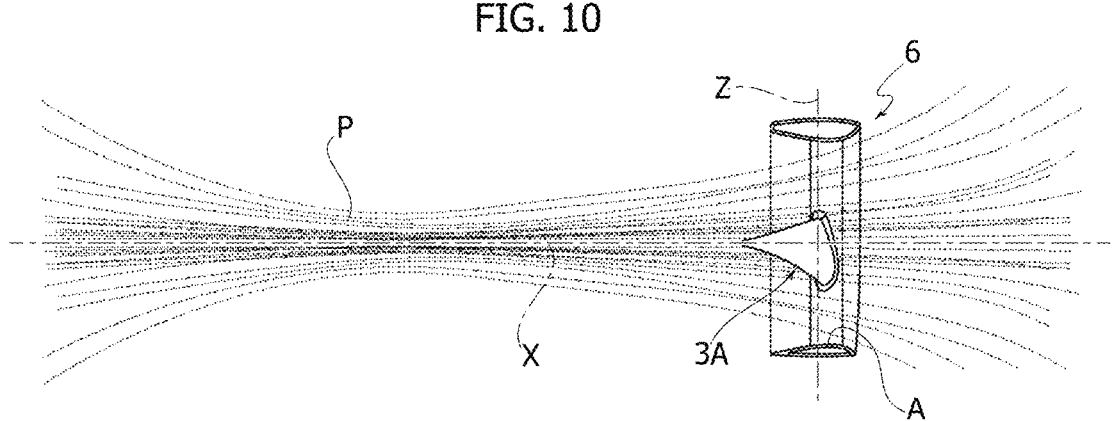
FIG. 10 shows the principle of operation of the fan in the device according to the invention.

Referring to FIG. 10, in the preferred embodiment, the conformation of the blades B is such as to converge the airflow towards a focus point positioned downstream the fan with reference to the flow direction. The curvature and the three-dimensional conformation of the blade B are optimized in order to obtain the desired degree of convergence.

Preferably, the distance between said focal point P and the median plane Z (see FIG. 10) of the blade is equal to 1.8-2.2 the internal diameter of said guide flow in correspondence with said median plane.

Thanks to this characteristic, the fan of the device according to the invention presents a higher efficiency and a higher thrust.

Figure 12:
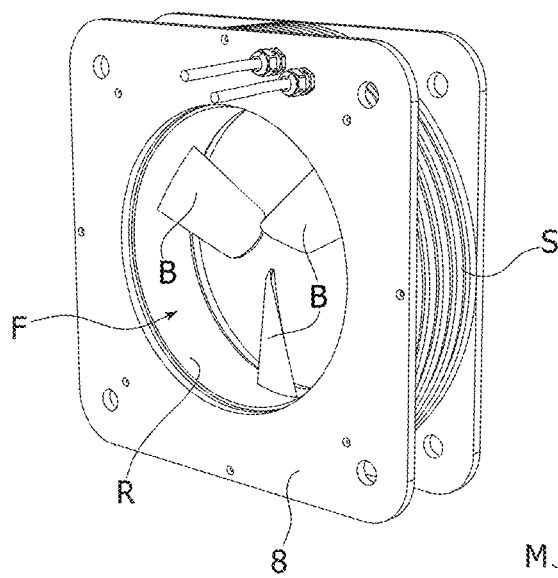
FIG. 12 is a perspective view of an embodiment of the electric motor unit, with the fan associated with it.
Figure 13:
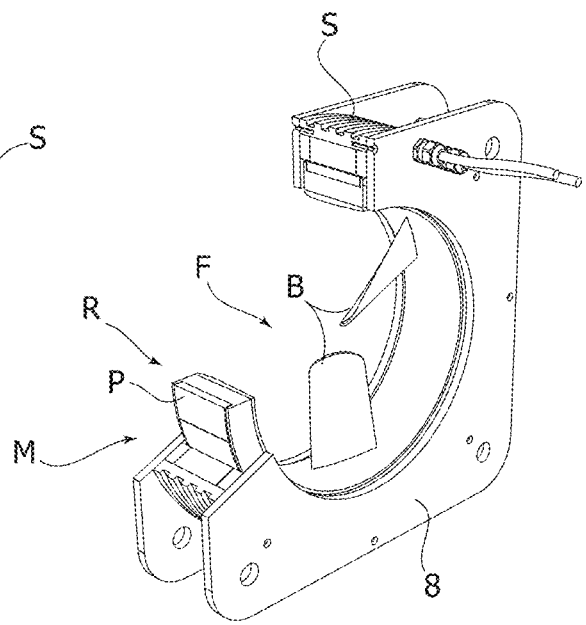
FIG. 13 is further perspective view, partially in cross-section, of the assembly of FIG. 12.
Figure 14:
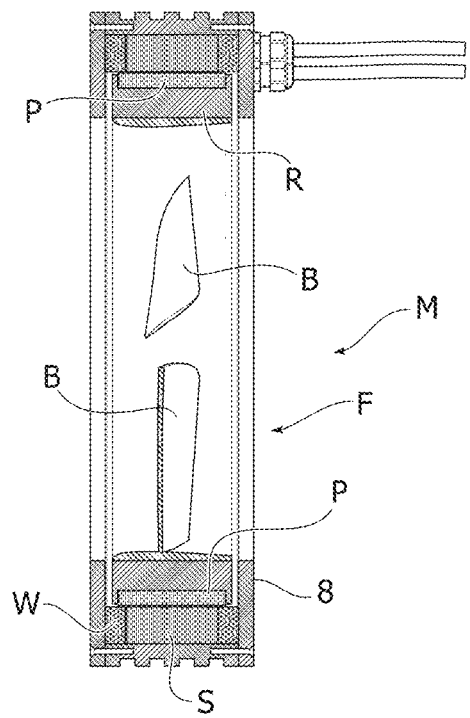
FIG. 14 is a view in cross-section of the unit of FIGS. 12, 13, in a plane containing the axis of the unit.

FIGS. 12-14 show another embodiment of the unit of the electric motor M with the fan F associated with it. In these figures, parts corresponding to the previous figures are indicated with the same reference numbers. The blades B of the fan F radially protrude towards the interior of the ring defined by the rotor R, which is rotatable within the annular stator S. The stator S, secured to the frame 8, is provided with windings W, while the rotor carries a series of permanent magnets P.

Naturally, while the principle of the invention remains the same, the details of construction and the embodiments may widely vary with respect to what has been described and shown purely by way of example, without departing from the scope of the invention.

What is claimed is:

1. Air-heating blower device (2) for a passenger compartment of a motor vehicle, said device comprising:
   a body (3) with at least one inlet opening (4a,4b) and at least one outlet opening (4c,4d),
   an electrically driven axial fan (F) rotatably mounted around its axis within the body (3) of said device for generating a flow of air from the inlet openings (4a,4b) to the outlet openings (4c,4d), and
   an electric heater (H) carried by the body (3) and adapted to heat the airflow directed towards the outlet opening (4c,4d),
   characterized in that the fan (F) is associated to an electric motor (M) with toroidal geometry, having an annular rotor (R) which is rotatable within an annular stator (S) and defining a central opening inside thereof, said fan (F) having one or more blades (B) which are carried by the rotor (R) and each blade extending into said central opening towards a free end of the blade which terminates at a distance from the central axis of the fan, and in that the annular body of the rotor (R) and/or the annular body of the stator (S) define a guide tube for the airflow activated by the fan (F), and
   in that said electric heater (H) comprises a heater body to which one or more electric resistors are associated, said heater body (H) having a substantially cylindrical shape, having a heater axis substantially aligned with the axis of said fan, so as to be embedded within the airflow activated by the fan (F).

2. Device according to claim 1, characterized in that said device constitutes an independent unit intended to be associated to the dashboard of a motor vehicle.

3. Device according to claim 1, characterized in that the conformation of said one or more blades (B) is such as to converge the airflow towards a focus point (P) positioned downstream the fan (F) with reference to the flow direction.

4. Device according to claim 1, characterized in that the body (3) of the device is disposed within a dashboard (1) of a motor vehicle and has a first inlet opening (4a) communicating with interior of the motor vehicle, a second inlet opening (4b) communicating with an external air supplied duct and a swivel door (6) for controlling communication of the two inlet openings (4a,4b) with a fan (F).

5. Device according to claim 1, characterized in that the body (3) of the device is intended to be positioned within a dashboard (1) of a motor vehicle and has a first outlet opening (4c) for directing the flow of air towards a windshield and/or the passengers of the motor vehicle, a second outlet opening (4d) for directing the flow of air towards the floor of the motor vehicle and a door (7) for controlling communication of the fan with the two outlet openings (4c,4d).

6. Device according to claim 5, characterized in that the first outlet opening (4c) is provided with adjustable louvers (12).

7. Device according to claim 1, characterized in that said guide tube for the air flow generated by said axial fan (F) is provided with stationary fins supporting said cylindrical heater body in a cantilevered way.

8. Device according to claim 1, characterized in that the heater body (H) has a cylindrical tubular shape and is arranged in such a way that its inner surface and/or its outer surface are exposed to the airflow.

9. Device according to claim 1, characterized in that the heater body (H) is a solid cylindrical body, arranged in such a way that its outer surface is exposed to the airflow.

10. Device according to claim 1, characterized in that the outer surface of the heater body (H) has a plurality of radially-arranged longitudinal fins (9).

11. Device according to claim 1, characterized in that the device further comprises at least one electric cooler (10).

12. Device according to claim 11, characterized in that the electric motor (M) for driving the fan, the electric heater (H) and/or the electric cooler (10) are connected to the battery of the electric circuit of the motor vehicle, to the on board electric generator and to an electronic control unit programmed to enable the power supply of the heater and/or the Peltier device has a function of the charge state of the battery and/or the operating condition of the electric generator.

13. Device according to claim 1, characterized in that said electric heater (H) has multi-coils and it is arranged to be powered either by low voltage batteries of the vehicle, or directly by the electric mains supply.

14. An electrically powered motor vehicle comprising one or more devices according to claim 1, distributed over one or several compartments-areas of the electric vehicle, for a pre- heating conditioning or the maintenance of a predetermined temperature at said compartments-areas, said devices being arranged to be powered from the electric mains supply and to be controlled by a remote control unit.

* * * * *